Oct. 11, 1966  R. A. PANGBURN  3,278,072
SLUSH PUMP VALVE POT COVER
Filed March 4, 1965  2 Sheets-Sheet 1
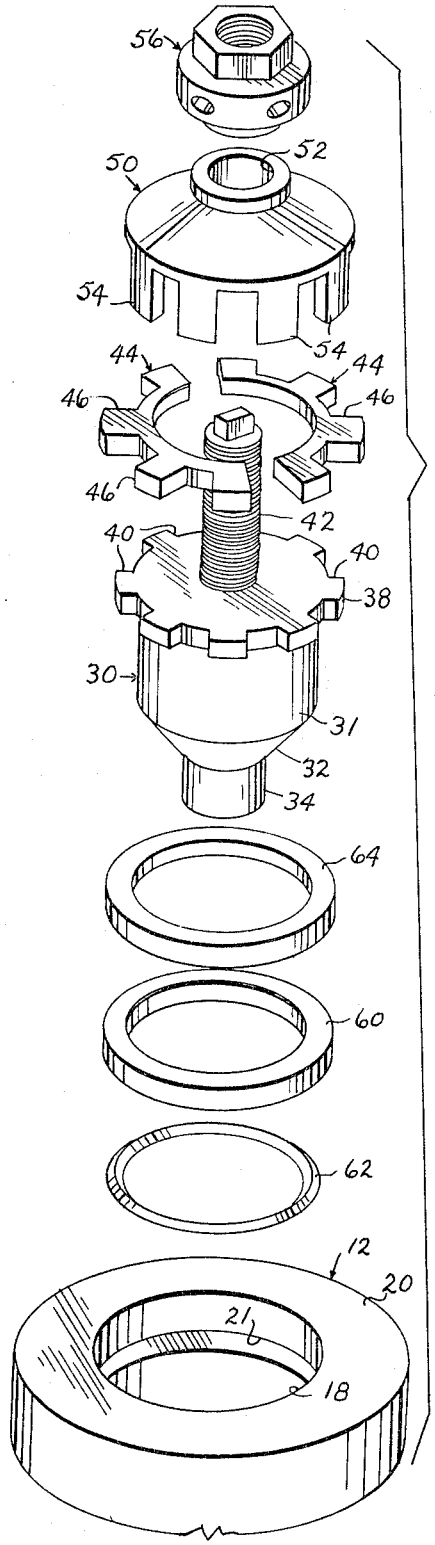
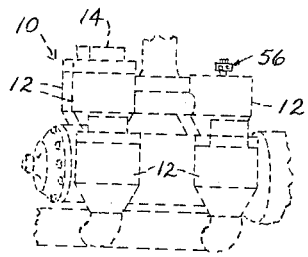
FIG. 1
FIG. 2
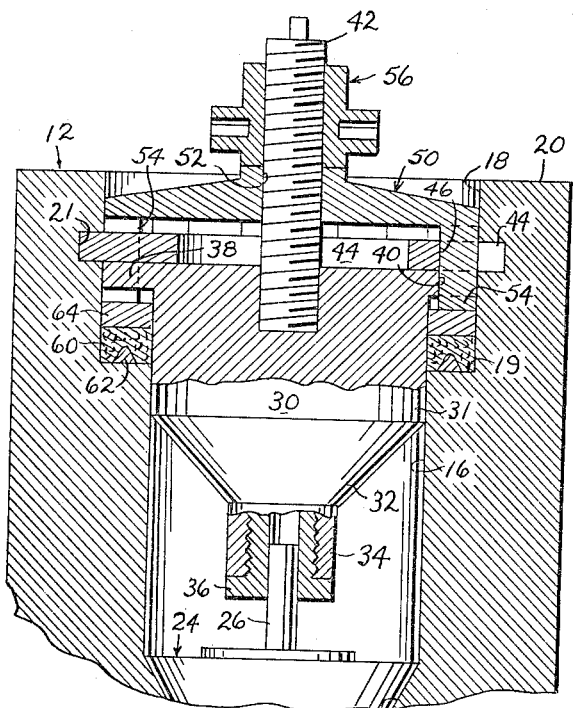
FIG. 3
RAYMOND A. PANGBURN
*INVENTOR.*
BY
*Robert K. Rhea*
AGENT Oct. 11, 1966  R. A. PANGBURN  3,278,072
SLUSH PUMP VALVE POT COVER
Filed March 4, 1965  2 Sheets-Sheet 2

RAYMOND A. PANGBURN
INVENTOR.

BY
*Robert K. Rhea*
AGENT

United States Patent Office 3,278,072
Patented Oct. 11, 1966

3,278,072
SLUSH PUMP VALVE POT COVER
Raymond A. Pangburn, P.O. Box 94364,
Oklahoma City, Okla.
Filed Mar. 4, 1965, Ser. No. 437,125
7 Claims. (Cl. 220—55)

The present invention is a continuation-in-part of my copending application, filed July 27, 1964, Serial No. 383,459, entitled, "Slush Pump Valve Cover."

The present invention relates to pumps and more particularly to an improved valve cover or cap for slush pumps.

Slush pumps of relatively large capacity are conventional equipment in oil well drilling and are used for circulating the drilling fluid. These pumps have generally cylindrical shaped upwardly open intake and exhaust fluid transferring bodies, commonly called "valve pots" which are respectively equipped with fluid intake and exhaust valves. The valve pots must be provided with means permitting access to the valve therein to service the valve. To accomplish this a cap or cover is usually provided at the upwardly disposed end of each valve pot which is usually attached to the valve pot by a plurality of stud bolts or bolts and nuts. A recent improvement comprises a ring or disk-like cap which is threadedly secured to the valve pot by a single member. This single member frequently works loose during operation of the pump resulting in malfunction of the associated valve. Furthermore, the type of cover in which a plurality of bolts holds the cover in place requires considerable time to remove and replace each cap or cover resulting in extensive shut down time.

It is, therefore, the principal object of the invention to provide an improved replaceable valve cover or cap for a slush pump.

Another object is to provide a valve cover or cap which employs a single bolt and nut which is connected in a novel manner with each respective valve pot body.

Yet another object is to provide a device of this class which may be connected with existing slush pump valve pots with only a slight modification thereof and may be incorporated in the design of valve pots to be manufactured.

A further object is to provide a device of this class wherein tightening a valve pot cover nut compresses packing means into sealing relation between the valve pot body and valve pot plug.

The present invention accomplishes these and other objects by connecting a bolt and nut to a valve pot plug which bears against a pressure cap. Ring means, interposed between the valve pot plug and pressure cap, cooperates with the valve pot body in closing the valve pot opening.

Other objects will be apparent from the following description when taken in conjunction with the accompanying single sheet of drawings, wherein:

FIGURE 1 is a fragmentary dotted line perspective view of a conventional slush pump illustrating, by solid lines, a portion of the device when installed therein;

FIGURE 2 is an exploded perspective view of the components of the invention and their relation to a fragment of a valve pot body;

FIGURE 3 is a fragmentary vertical cross-sectional view, on a different scale, of a slush pump valve pot body having the device installed therein;

Like characters of reference designate like parts in those figures of the drawings in which they occur.

In the drawings:

Figure 4:
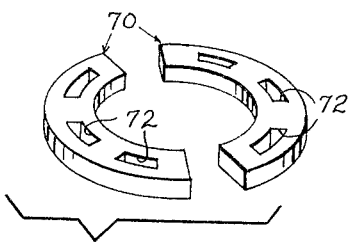
FIGURE 4 is a perspective view illustrating an alternative embodiment of the locking ring.

The reference numeral 10 indicates a fragment of a conventional slush pump having a plurality of generally cylindrical-shaped bodies or valve pots, indicated at 12, respectively housing fluid intake and exhaust valves. One type of conventional removable valve pot cover or cap is indicated at 14.

Referring more particularly to FIGS. 2 and 3, there is illustrated a fragment of a cylindrical valve pot 12 having a central bore 16, an enlarged or counterbore 18 forming an annular shoulder 19 and an upper horizontal end surface 20. Adjacent the upper end of the valve pot body 12 the wall forming the counterbore 18 is undercut to form an annular recess or groove 21. The inward end of the bore 16 is provided with a valve seat 22 for receiving a conventional slush pump valve 24 having a valve guide stem 26.

A valve pot plug is indicated generally at 30. The plug 30 has a central cylindrical portion 31 which is closely received by the bore 16. The depending end portion of the valve body is tapered to form a conical-shape, as at 32, terminating in a depending cylindrical portion 34 which is centrally bored and threaded to receive a centrally bored bushing 36. The bushing 36 slidably receives the valve guide stem 26. The opposite or upper end of the valve plug 30 is provided with an annular flange 38 which has its peripheral edge portion splined or slotted forming openings in circumferentially spaced-apart relation, as at 40. Diametrically the splined flange 38 is freely received by the counterbore 18.

A threaded bolt 42 is coaxially connected with the valve pot plug 30. The length of the bolt 42 is such that it projects upwardly above the plane formed by the upper end surface 20 of the valve pot body 12 when the valve plug 30 is positioned in the valve pot body in the manner described hereinbelow.

A split locking ring 44 overlies the outer peripheral edge of the upper surface of the flange 38 and extends into the valve pot body groove or recess 21. The peripheral edge portion of the split ring 44 is provided with a like plurality of circumferentially spaced-apart splines or openings 46 in cooperative alignment with respect to the valve pot plug flange splines 40.

A generally circular pressure cap 50 overlies the locking ring 44 and valve pot plug 30. The pressure cap 50 includes a circular body portion provided with a central bore 52 which loosely surrounds the bolt 42. The pressure cap 50 is further provided with a plurality of depending spaced-apart wall-like leg members 54. The number of leg members is equal to the number of splines 40. The size of each leg member 54 is such that it may be freely received in sliding relation by the respective aligned splines 40 and 46 and the length of the leg members 54 is such that they project downwardly beyond the lower surface of the valve pot flange 38 for the purposes presently explained.

A nut 56 is threadedly engaged with the upper end portion of the bolt 42. Obviously, a stud bolt, not shown, may be used in lieu of the bolt 42 and nut 56. A gasket or packing ring 60 supported by the annular shoulder 19 surrounds a portion of the valve pot plug. The gasket ring 60 is conventional and is provided, in its depending edge surface, with an inverted V-shaped groove which cooperatingly receives a V-shaped gasket spreader ring 62. A metallic ring 64 surrounds a portion of the valve pot plug and overlies the gasket 60.

As shown in FIG. 3, the length of the valve pot plug 30 is such that a portion of the central cylindrical portion 31 is positioned within the bore 16 and the flange 38 overlies the pressure ring 64.

Referring also to FIG. 4, an alternate embodiment of the split lock ring is illustrated and indicated by the numeral 70. The split lock ring 70 is characterized by a peripheral edge portion which is nested by the body groove 21 and, similarly, the width of the lock ring is such that it projects inwardly of the splined annular flange 38 and the adjacent upper peripheral edge surface of the valve pot plug 30. Apertures or openings 72 extend through the lock ring 70 in cooperative alignment with respect to the annular flange splines or openings 40 so that the legs 54 of the cap 50 may project through the lock ring openings 72 and contact the gasket pressure ring 64.

Figure 6:
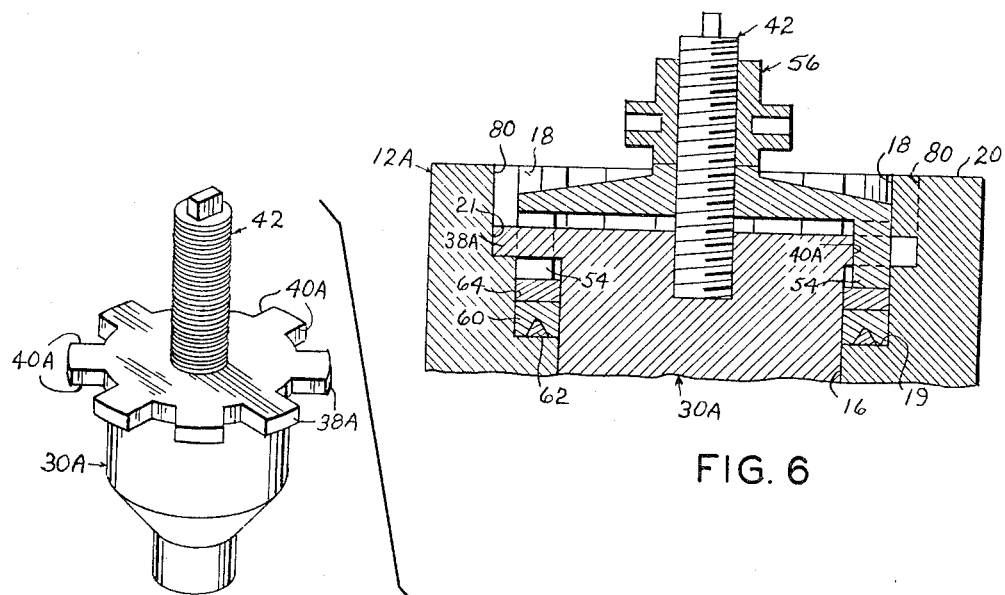
Figure 5:
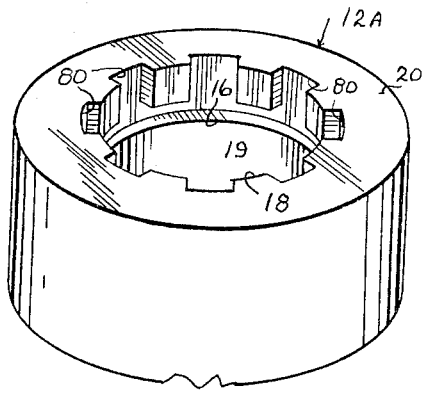
FIGURE 5 is an exploded perspective view of an alternative valve pot plug and a fragment of a modified valve pot body; and, FIGURE 6 is a fragmentary vertical cross-sectional view of the alternative valve pot plug in operative position within the valve pot body.

Referring more particularly to FIGS. 5 and 6, an alternative arrangement is illustrated for locking the valve pot plug within a valve pot body which eliminates using either split lock ring 44 or 70. The valve pot body, indicated by the numeral 12A is substantially identical with respect to the valve pot body 12 having an upper end surface 20, a bore 16, a counterbore 18 forming an annular shoulder 19, and is similarly provided with the annular groove 21 adjacent its end surface 20. The outer end portion of the counterbore wall 18 is further provided with a plurality of grooves or splines 80 which extend inwardly from the end surface 20 and communicate with the annular groove 21. The valve pot plug, indicated at 30A, is identically formed with respect to the valve pot plug 30 with the exception that its peripheral flange 38A is diametrically substantially equal with respect to the diameter of the groove 21 and is similarly grooved or splined, as at 40A, in cooperation with respect to the splines 80 in the body 12A so that the valve pot plug flange 38A may be cooperatively received by the body 12A. The flange 38A contacting an inward surface of the groove 21 supports the valve pot plug. The radial depth of the splines 40A is substantially equal to the width of the annular flange 38A so that a space or opening, substantially equal in width to the width of the annular shoulder 19A, remains adjacent the counterbore wall 18 to slidably receive the legs 54 of the pressure cap 50.

Operation

In operation the device is installed as described hereinabove. When the nut 56 is tightened it lifts the valve pot plug flange 38 so that its upper surface contacts the lower surface of the locking ring 44 while simultaneously forcing the pressure cap 50 downwardly so that the depending ends of the legs 54 contact the metallic ring 64. This impinges the locking ring between the upper or outer peripheral end surface of the valve pot plug and the opposing wall surface formed by the groove 21. Thus the nut may be further tightened to force the leg members 54 downwardly against the metallic ring 64 thus spreading the gasket 60 and forming a fluid tight seal between the wall of the counterbore 18, shoulder 19 and a portion of the periphery of the valve pot plug.

The operation of the alternative split lock ring 70 and the remaining components of the device are identical with that described hereinabove with the exception that the alternative split locking ring is characterized by an imperforate outer edge portion which is disposed within the groove 21 to add rigidity and strength to the assembled device when under pump pressure generated within the bore 16.

The operation of the alternative valve pot plug 30A and the splined valve pot body 12A is substantially identical with that described hereinabove with the exception that the split lock rings 44 and 70 are omitted. The gasket spreader ring 62, gasket 60 and metallic ring 64 are similarly assembled within the counterbore. The valve pot plug 30A is introduced into the bore 16 by the cooperating sliding fit of the body splines 80 receiving the splined annular flange 38A. When the flange 38A is positioned within the body groove 21 the valve pot plug 30A is manually rotated about its longitudinal axis so that the splines 40A are cooperatingly aligned with the body splines 80. Thereafter, the pressure cap 50 is positioned within the counterbore 18 with the leg members 54 projecting through the annular flange splines 40A and contacting the metallic ring 64. The nut 56, engaged with the bolt 42, is then tightened to compress the gasket means 60.

Obviously, the invention is susceptible to some change or alteration without defeating its practicability, and I therefore do not wish to be confined to the preferred embodiment shown in the drawings and described herein, further than I am limited by the scope of the appended claims.

I claim:

1. A valve pot cover for a slush pump of the type having a centrally bored outwardly open valve pot body, said body having a counterbore formed in its outwardly open end portion forming an outwardly facing annular shoulder, the wall of the body forming the counterbore having an annular groove adjacent the outwardly open end, comprising: a valve pot plug slidably received by the central bore in said body, said valve pot plug having an end surface facing toward the open end of said body; a lock ring removably received by the groove in the wall forming the counterbore, said lock ring overlying a portion of said valve pot plug end surface, said lock ring having openings therethrough adjacent the wall of the body forming the counterbore; gasket means interposed between said lock ring and said annular shoulder; cap means disposed outwardly of said lock ring and contacting said gasket means; and bolt and nut means extending through said cap means and connected with said valve pot plug for impinging the latter against said lock ring and compressing said gasket means.

2. Structure as specified in claim 1 in which said cap means includes spaced-apart leg members projecting slidably inward through the openings in said lock ring.

3. A valve cover for a slush pump of the type having a centrally bored outwardly open valve pot body, said valve pot body having a counterbore in its outwardly open end portion forming an outwardly facing annular shoulder and having an annular groove formed in the wall of the counterbore adjacent its outer end, comprising: a valve pot plug extending inwardly into the central bore of said valve pot body, said valve pot plug having an annular flange overlying said annular shoulder, said flange having openings therethrough; gasket means interposed between said annular shoulder and said annular flange; a lock ring removably received by the groove in said valve pot body and limiting the outward movement of said valve pot plug, said lock ring having openings therethrough in cooperative alignment with the openings in said annular flange; cap means disposed outwardly of said lock ring and contacting said gasket means; and bolt and nut means extending through said cap means and connected with said valve pot plug for impinging said valve pot plug against said lock ring and compressing said gasket means to form a fluid tight seal around said valve pot plug.

4. Structure as specified in claim 1 in which said cap means includes a centrally bored portion slidably received by the counterbore; and leg members connected to said centrally bored portion, said leg members projecting inwardly through the aligned openings in said annular flange and said lock ring.

5. A valve cover for a slush pump of the type having a centrally bored upwardly open valve pot, said valve pot having a counterbore in its upwardly open end portion forming an upwardly facing annular shoulder and having an annular groove formed in the wall of the counterbore adjacent its upper end, comprising: a valve pot plug slidably received by the central bore in said valve pot, said valve pot plug having an upper end defined by an annular splined flange freely received by the counterbore; gasket means interposed between said annular shoulder and said splined flange; a lock ring overlying the upper outer peripheral end edge portion of said valve pot plug and projecting into said annular groove, said lock ring having a splined periphery cooperatingly aligned with the splines in said annular flange; a bolt coaxially secured to said valve pot plug and projecting beyond the upwardly open end of said valve pot; a centrally bored pressure cap surrounding said bolt and overlying that portion of said lock ring within the counterbore, said pressure cap having a plurality of leg members projecting through the splines in said lock ring and said annular flange and bearing against said gasket means; and a nut threadedly engaged with the free end portion of said bolt for lifting said annular flange into contact with said locking ring and forcing said leg members downwardly against said gasket means.

6. A valve cover for a slush pump of the type having a centrally bored outwardly open valve pot, said valve pot having a counterbore in its outwardly open end portion forming an outwardly open annular shoulder and having an annular groove formed in the wall of the counterbore adjacent its outwardly open end, said valve pot having splines formed in its wall extending inwardly from its outwardly open end and communicating with the annular groove, comprising: a valve pot plug slidably received by the central bore in said valve pot, said valve pot plug having an outer end surface defined by an annular flange diametrically substantially equal to the diameter of the annular groove, said annular flange having a splined periphery cooperatingly received by the splined end portion of said valve pot; a bolt coaxially secured to the outwardly disposed end portion of said valve pot plug; gasket means interposed between said annular shoulder and said splined flange; a centrally bored pressure cap surrounding said bolt and extending inwardly of said annular flange within the counterbore toward said gasket means; and a nut threadedly engaged with the free end portion of said bolt.

7. Structure as specified in claim 6 in which said pressure cap is characterized by a plurality of leg members cooperatingly received slidably by the splines in said annular flange.

No references cited.

THERON E. CONDON, *Primary Examiner.*

J. B. MARBERT, *Assistant Examiner.*